United States Patent [19]

Nakamichi

[11] Patent Number: 5,544,148
[45] Date of Patent: Aug. 6, 1996

[54] COMPACT CONFIGURATION DISK PLAYER

[75] Inventor: Niro Nakamichi, Tokyo, Japan

[73] Assignee: Nakamichi Corporation, Tokyo, Japan

[21] Appl. No.: 246,270

[22] Filed: May 19, 1994

[30] Foreign Application Priority Data

May 20, 1993 [JP] Japan .................................. 5-141489
May 20, 1993 [JP] Japan .................................. 5-141490

[51] Int. Cl.⁶ .......................... G11B 17/10; G11B 17/22
[52] U.S. Cl. .......................... 369/192; 369/36; 369/77.1; 369/263; 360/98.07
[58] Field of Search ................. 369/34, 36, 38, 369/39, 77.1, 178, 191, 192, 204, 258, 263; 360/98.01, 98.04, 98.06, 98.07, 98.08, 99.08

[56] References Cited

U.S. PATENT DOCUMENTS

| | | | |
|---|---|---|---|
| 3,934,883 | 1/1976 | Chambers | 360/99.08 |
| 4,561,078 | 12/1985 | Nakayama | 369/38 |
| 4,567,584 | 1/1986 | Kawakami | 369/38 |
| 4,653,037 | 3/1987 | Nakayama et al. | 369/38 |
| 4,797,244 | 1/1989 | Tsuruta et al. | 369/38 |
| 4,797,865 | 1/1989 | Imai et al. | 369/39 |
| 4,878,137 | 10/1989 | Yamashita et al. | 360/98.05 |
| 4,969,138 | 11/1990 | Ikedo et al. | 369/36 |
| 4,993,008 | 2/1991 | Shiba | 369/3 |
| 5,034,937 | 7/1991 | Caspers et al. | 369/36 |
| 5,062,092 | 10/1991 | Siryj et al. | 369/38 |
| 5,117,409 | 5/1992 | Shimizu et al. | 369/36 |
| 5,123,001 | 6/1992 | Nakamichi et al. | 369/36 |
| 5,161,138 | 11/1992 | Caspers | 369/36 |
| 5,210,728 | 5/1993 | Noguchi et al. | 369/36 |
| 5,220,548 | 6/1993 | Nakatsukasa et al. | 369/36 |

FOREIGN PATENT DOCUMENTS

| | | |
|---|---|---|
| 62-47893 | 3/1987 | Japan . |
| 62-83254 | 5/1987 | Japan . |
| 63-329258 | 2/1988 | Japan . |
| 63-79273 | 4/1988 | Japan . |
| 63-200354 | 8/1988 | Japan . |
| 63-130950 | 8/1988 | Japan . |
| 63-293756 | 11/1988 | Japan . |
| 171338 | 5/1989 | Japan . |
| 150023 | 10/1989 | Japan . |
| 156459 | 11/1989 | Japan . |
| 26151 | 2/1990 | Japan . |
| 26542 | 2/1990 | Japan . |
| 2143942 | 6/1990 | Japan . |
| 2260274 | 10/1990 | Japan . |
| 244388 | 11/1990 | Japan . |
| 316126 | 4/1991 | Japan . |
| 3201259 | 9/1991 | Japan . |
| 424512 | 6/1992 | Japan . |
| 462157 | 10/1992 | Japan . |
| 574034 | 3/1993 | Japan . |
| 533361 | 4/1993 | Japan . |

*Primary Examiner*—Stuart S. Levy
*Assistant Examiner*—Paul J. Ditmyer
*Attorney, Agent, or Firm*—Morrison Law Firm

[57] ABSTRACT

A magazine in a disk player stores disks therein. A transport mechanism transports a selected one of the disks between the magazine and a disk reader. The disk reader is positioned to read a selected disk while a center aperture of the selected disk overlaps disks remaining in the magazine. A first embodiment has three edge rollers which engage an edge of the selected disk to rotatably support the selected disk at the read position. One of the edge rollers which is external to the magazine is driven by a driver mechanism to rotate the selected disk for reading. A second embodiment includes carriages for supporting the disks in the magazine and at the read position. The carriages each have a rotatable shaft for engaging the center apertures of the disks. When a selected disk is moved to the read position, a pair of idler rollers and a driving roller engage top and bottom surfaces of the selected disk. The idler roller is driven by a driver mechanism to rotate the selected disk. The idler roller is angled with respect to either a radius or a plane of the selected disk to impart a radial bias upon the selected disk.

22 Claims, 10 Drawing Sheets

COMPACT CONFIGURATION DISK PLAYER

BACKGROUND OF THE INVENTION

The present invention relates to a disk player for storing and playing disks, and in particular, relates to a changer-type disk player having a magazine and capable of playing back a disk while a center aperture of the disk overlaps disks remaining in the magazine.

Changer-type disk players exist having a magazine for storing a plurality of disks and mechanisms for transporting selected disks to and from a disk reader in the disk player. Generally, in such devices, the selected disk is read by a disk reader at a read position whereat the selected disk is completely removed from the magazine. Such an arrangement requires that the selected disk be displaced a distance at least equal to a diameter of the disk. Therefore, the disk player must be large enough to accommodate this range of displacement.

Alternative designs of disk players exist wherein a selected disk is partially removed from the magazine. In such devices the selected disk is moved from the magazine a distance sufficient to align a center aperture of the selected disk over a turntable external to the magazine. The disk is then played with a portion of the disk overlapping the other disks remaining in the magazine. The overlapping arrangement reduces the required displacement to a distance substantially equal to a radius of the disk plus a radius of the turntable. Examples of this kind of technology are well-known as indicated in Japanese laid-open patent no. 57-101679 and Japanese laid-open patent no. 62-212964.

A demand for more compact devices exists, particularly in connection with applications attempting to implement a changer-type disk playback device for automobile dashboards. The limitations in the depth dimension in the prior art technology makes it impossible to make a device compatible with DIN dimensions, which are generally used as the standard dimensions for car stereos. Therefore, disk player constructions are sought which further reduce the dimensional requirements of changertype disk players.

OBJECTS AND SUMMARY OF THE INVENTION

Accordingly, it is an object of the invention to provide a disk player which overcomes the drawbacks of the prior art.

It is a further object of the invention to provide a disk player having a reduced size capable of storing disks in a magazine and playing a selected disk withdrawn a minimal distance from the magazine.

It is a still further object of the invention to provide a magazine and disk reader assembly where a disk is displaced from a magazine for reading a distance substantially equal a radial dimension of readable medium on the disk.

Briefly stated, the present invention provides a disk player having a magazine for storing disks and a transport mechanism for transporting disks between the magazine and a disk reader. The disk reader is positioned to read a selected disk while a center aperture of the selected disk overlaps disks remaining in the magazine. A first embodiment has three edge rollers which engage an edge of the selected disk to rotatably support the selected disk at the read position. One of the edge rollers which is external to the magazine is driven by a driver mechanism to rotate the selected disk for reading. A second embodiment includes carriages for supporting the disks in the magazine and at the read position. The carriages each have a rotatable shaft for engaging the center aperture of disk. When a selected disk is moved to the read position, a pair of idler rollers and a driving roller engage top and bottom surfaces of the selected disk. The idler roller is driven by a driver mechanism to rotate the selected disk. The idler roller is angled with respect to either a radius or a plane of the selected disk to impart a radial bias upon the selected disk.

In accordance with these and other objects of the invention, there is provided a disk player for storing and playing disks comprising: a magazine for holding the disks; a disk reader for reading a selected disk removed from the magazine to a read position whereat a center aperture of the selected disk overlaps disks which remain in the magazine; means for aligning the selected disk in the magazine with the disk reader; means for transporting the selected disk between the disk reader and the magazine; and means for rotating the selected disk at the read position.

According to a feature of the invention there is provided means for rotating the selected disk having: support rollers engaging an edge of the selected disk; drive means for applying a force to an edge of the selected disk to rotate the disk; and means for biasing the drive means and support rollers into contact with the selected disk.

According to another feature of the invention there is provided means for rotating the selected disk having: an idler roller engaging a first surface of the selected disk at a perimeter thereof; drive means, including a driving roller, for applying a force to a second surface of the selected disk, opposing the first surface, to rotate the disk; and means for biasing the drive means and the idler roller into contact with the selected disk.

According to still another feature of the invention there is provided for positioning the driving roller with an axis thereof at an angle relative to the selected disk to impart a radial bias upon the selected disk.

According to a further feature of the invention there is provided a disk player for storing and playing disks comprising: a magazine for holding the disks; a disk reader for reading a selected disk removed from the magazine to a read position whereat a center aperture of the selected disk overlaps disks which remain in the magazine; means for aligning the selected disk in the magazine with the disk reader; means for transporting the selected disk between the disk reader and the magazine; support rollers engaging an edge of the selected disk at the read position; an edge roller applying to torque to the selected disk at the read position; and means for biasing the edge and support rollers into contact with the edge of the selected disk.

According to a still further feature of the invention there is provided a disk player for storing and playing disks comprising: a magazine for holding the disks; a disk reader for reading a selected disk removed from the magazine to a read position whereat a center aperture of the selected disk overlaps disks which remain in the magazine; means for aligning the selected disk in the magazine with the disk reader; means for transporting the selected disk between the disk reader and the magazine; carriages for carrying disks between the magazine and the read position; and the carriages including means for rotatably supporting the disks above surfaces of each of the carriages; an idler roller engaging a first surface of the disk at a the read position; a driving roller for applying a force to a second surface of the selected disk, opposing the first surface, to rotate the disk at the read position; means for biasing the driving roller and the idler roller into contact with the selected disk; and means for positioning the driving roller with an axis thereof at an angle relative to the selected disk to impart a radial bias upon the selected disk.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
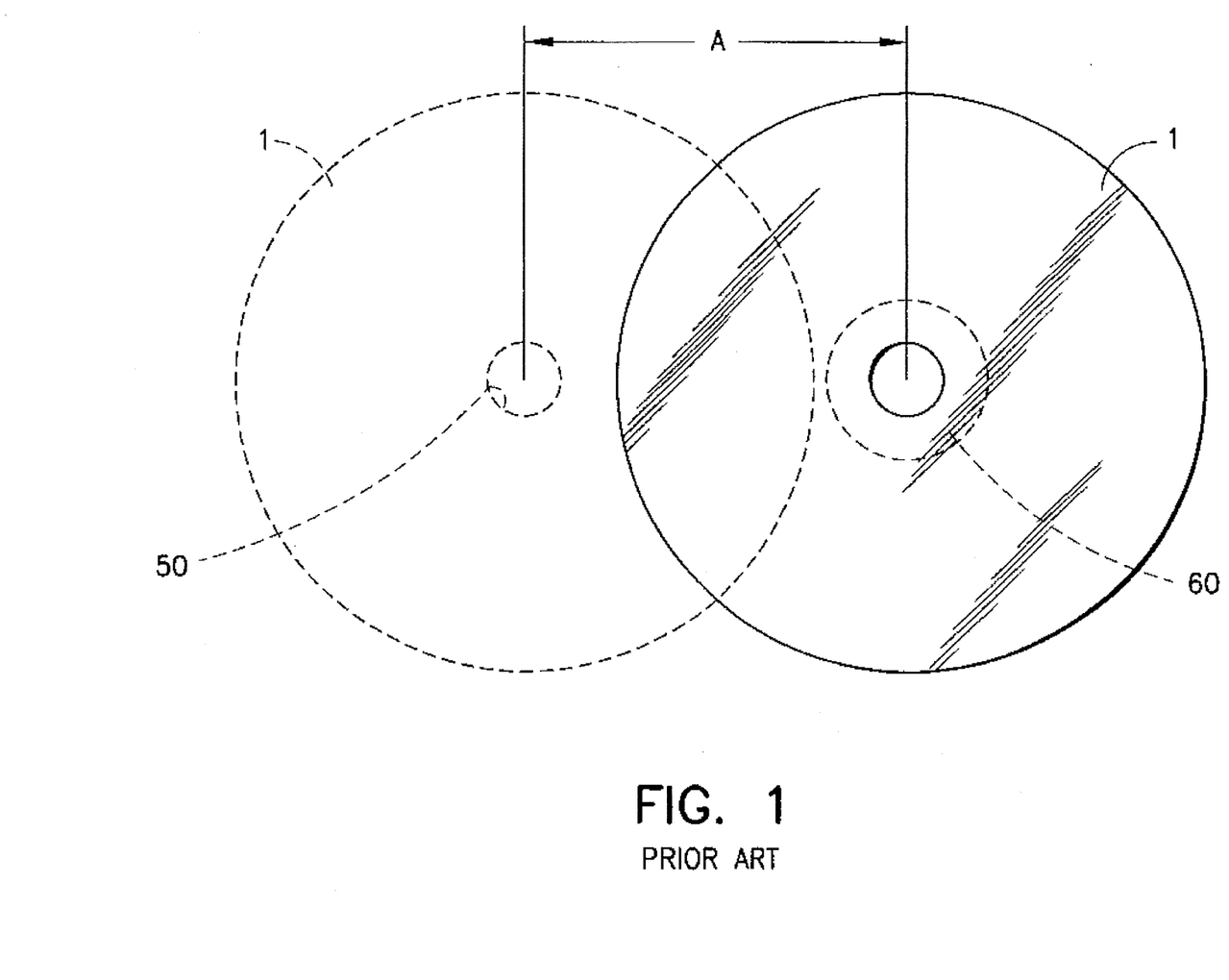
FIG. 1 is a plan view indicating a relative positioning of store and read positions in a disk player of the prior art.

Referring to FIG. 1, there is shown a diagram illustrating disk transport in a prior art disk player having an overlapped disk playing arrangement. A disk 1 has a center aperture 50. The disk 1 is transported between a storage position, shown in a dashed outline, corresponding to a concentric location within a magazine (not shown) and a read position shown in a solid line. The magazine holds a plurality of disks (not shown) concentrically stacked above and below the disk 1 shown. In order to play the disk 1, a transport mechanism (not shown) moves the disk 1 to a reading position shown by a solid outline of the disk 1. In the reading position, the disk 1 overlaps the plurality of disks remaining in the magazine. A turntable 60 supports the disk 1 at the reading position. Dimension A represents the displacement of the disk 1 from the storage position to the reading position. It is clear that the dimension A must be sufficient to provide clearance between an outer perimeter of the turntable 60 and the plurality of disks (not shown) in the magazine whose positions are represented by the dashed outline of the disk 1 shown. Therefore, a minimum value of dimension A must be at least equal to a radius of the disk 1, plus a radius of the turntable 60, plus the various tolerances permitted in construction of the prior art disk player. Therefore, since the diameter of the disk 1 and the center aperture 50 are fixed by convention, the prior art design is limited in that reduction of the dimension A is limited to reducing the turntable diameter, which must remain some infinitesimal amount larger than the center aperture 50 to support the disk. Thus, playing the disk 1 in an overlapping state allows the dimension A to be reduced from that of a non-overlapping configuration. However, further size reduction reaches a limit which cannot be circumvented by the prior art configuration.

Figure 2:
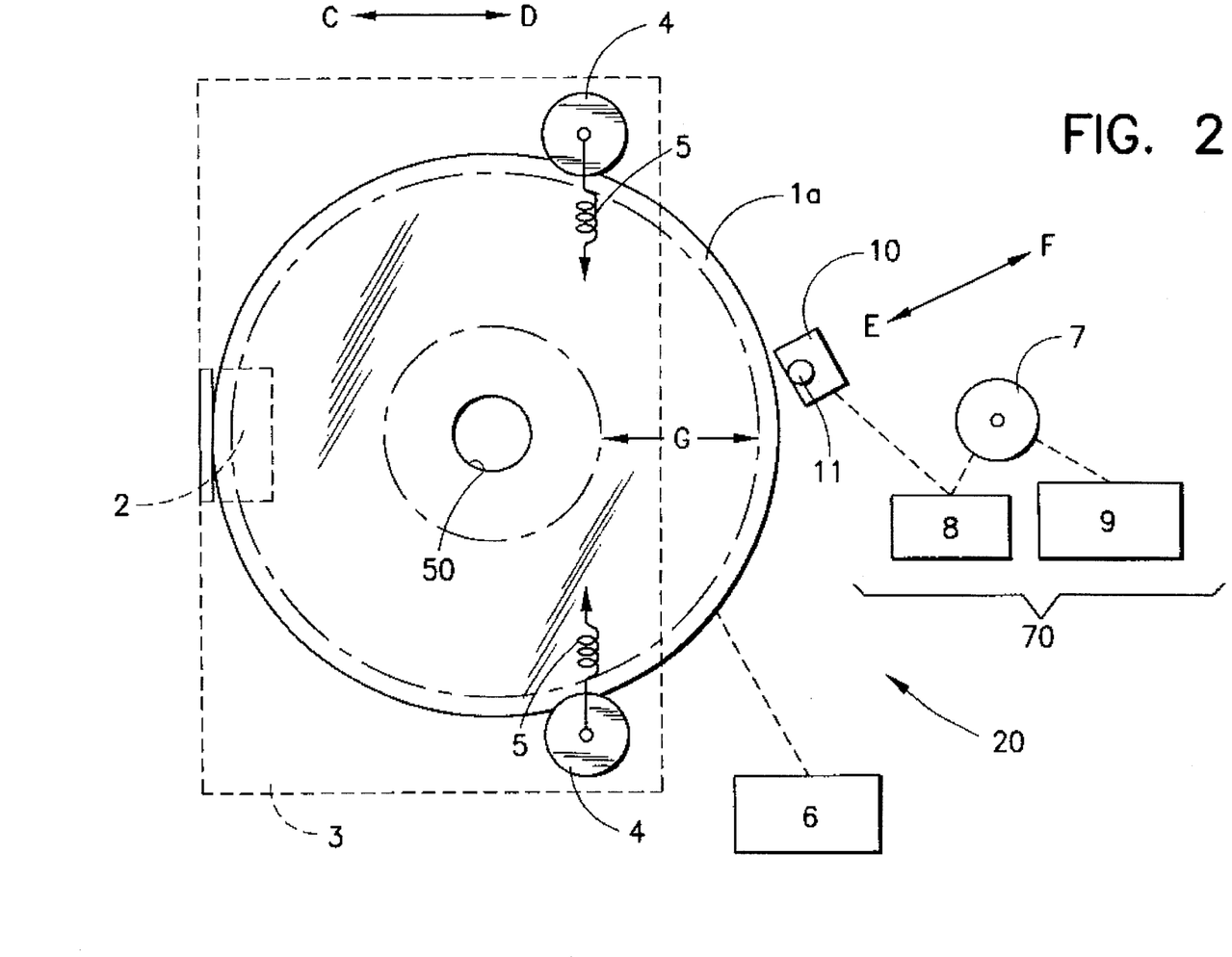
FIG. 2 is a plan view of a disk player according to an embodiment of the present invention.
Figure 3:
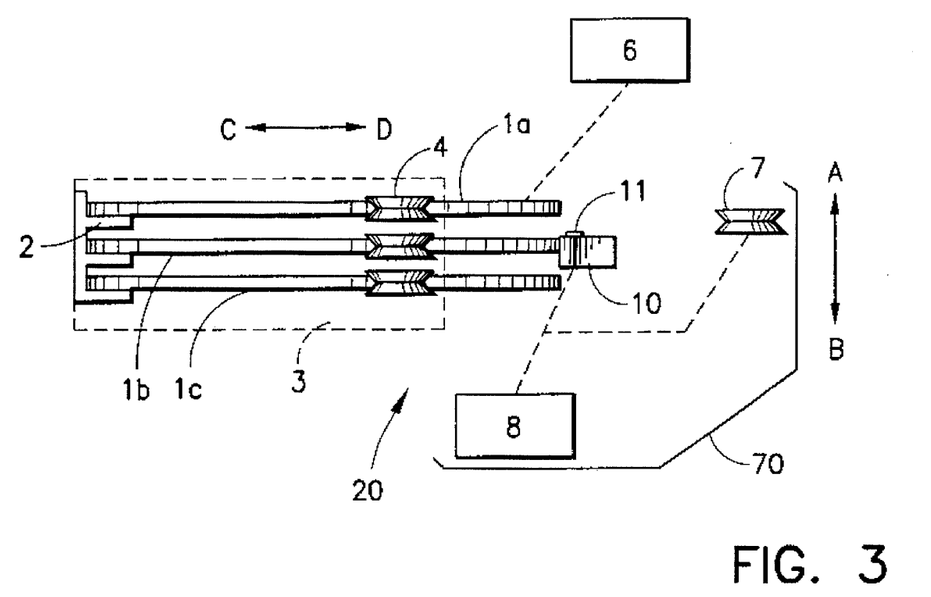
FIG. 3 is a side elevation view of the disk player of FIG. 2.

Referring to FIGS. 2 and 3, a first embodiment of a disk player 20 of the present invention is shown wherein use of a turntable is eliminated to provide a further reduction in the size of the disk player 20. A first disk 1a is shown held in a magazine 3 which is capable of holding a plurality of disks, which, in the example presented, comprises three disks 1a–1c. Support projections 2 are incorporated at a rear of the magazine 3 to support the disks 1a–1c in conjunction with rollers 4. The rollers 4 have grooved edges and are slidably and rotatably supported in the magazine 3. Springs 5 bias the rollers 4 in a direction toward and pedicular to a center of the magazine 3 thereby exerting pressure upon the disks 1a–1c. The pressure exerted by the rollers 4 forces the disks 1a–1c, which are engaged with the grooves of the roller 4, towards the rear of the magazine 3 and onto the support projections 2. Thus, the support projections 2 and the rollers 4 resiliently secure the disks 1a–1c in the magazine 3 at three points providing stable support. Alternatively, the rollers 4 are formed of a material of sufficient resiliency to effect bias on the disks 1a–1c without the use of the springs 5. Such an embodiment would rely on the deformation of the rollers 4 to bias the disk 1a–1c and to permit removal of the disks 1a–1c. For purposes of illustration, the functioning the disk player 20 is discussed herein with reference to the first disk 1a, however, it is clear that the functions discussed apply to each of the disks 1a–1c in the disk player 20.

An optical pickup 10 is located just outside the perimeter of the plurality of disks 1a–1c in the magazine 3. A drive wheel 7, at a position proximate to the magazine 3, as discussed below, is rotated by a driver mechanism 9. The optical pickup 10 is mounted in conjunction with the drive wheel 7 to form a disk reader assembly 70. The disk reader assembly 70, and the magazine 3, are transported relative to one another by an alignment mechanism 8. The alignment mechanism 8 effects movement parallel to the axes of the disk 1a–1c and the A–B axis shown. The drive wheel 7 is thereby positionable in a plane of any one of the disks 1a–1c in the magazine 3. The optical pickup 10 also moves along in the direction of the E–F axis parallel to planes of the disks 1a–1c to effect scanning when a selected disk is aligned above the optical pickup. A disk transport mechanism 6 is selectively engaged with a selected disk in the magazine 3 to move the selected disk in and out of the magazine 3 in the direction C–D for alignment with the optical pickup 10.

Figure 4:
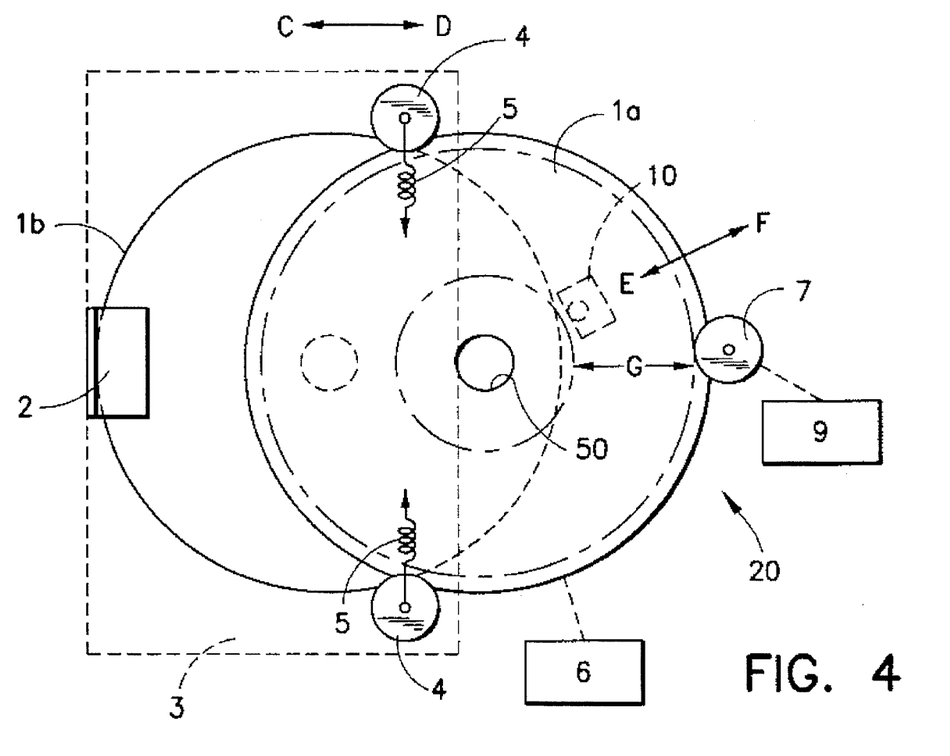
FIG. 4 is a plan view of the disk player of FIG. 2 showing a first disk in a read position.
Figure 5:
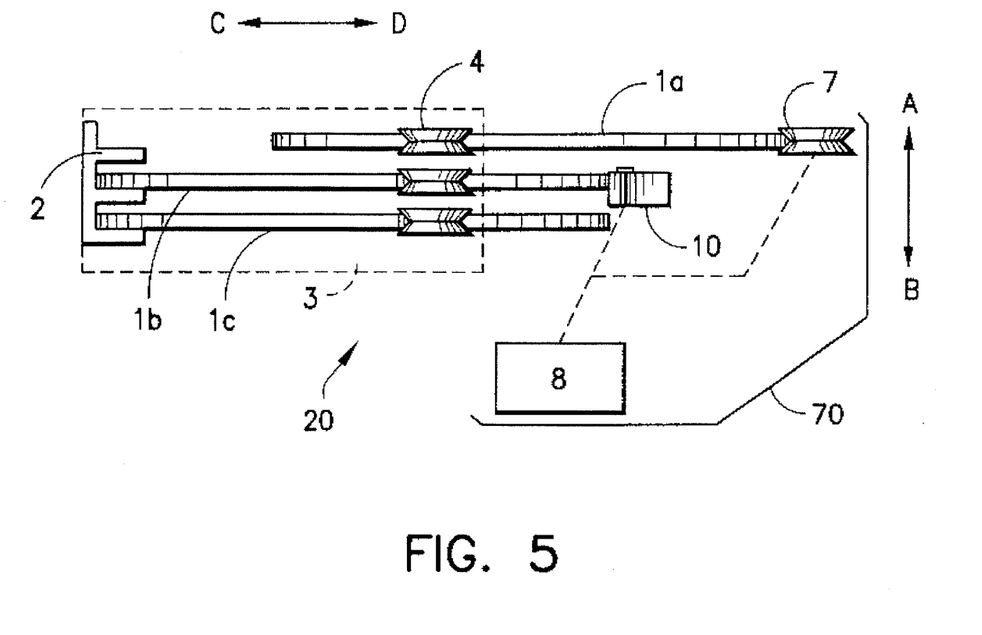
FIG. 5 is a side elevation view of the disk player of FIG. 2 showing the first disk in the read position.

Referring to FIGS. 4 and 5, the first disk 1a is shown moved to a read position whereat the rollers 4 and the drive wheel 7 engage a perimeter of the first disk 1 a at three points to provide stable support. The disk transport mechanism 6 moves the first disk 1 to the read position from its location in the magazine. As the first disk 1 travels to the read position, the rollers 4 are displaced apart from one another by the motion of the first disk. Initially, the bias of the rollers 4 functions to retain the first disk 1 within the magazine 3. However, once a center of the first disk 1 passes between the rollers 4, the bias of the rollers 4 applies force to the first disk 1a in a direction along the C–D axis expelling the first disk 1 from the magazine 3. The force of the rollers 4 then holds the first disk 1a at the read position in contact with the drive wheel 7. The drive wheel 7 is driven by the driver mechanism 9 to rotate the first disk 1a. The drive wheel 7 is formed of a resilient material, such as a synthetic rubber for example, which has a coefficient of friction suitable for applying sufficient force to rotate the first disk 1a, when pressure is applied by the rollers 4.

Although the drive wheel 7 is described in the present embodiment as applying a rotating force to the first disk 1a, it is realized that an idler wheel may replace the drive wheel 7, and that other means may be substituted for applying torque to the disk. For instance, one of the rollers 4 may be rotated to drive the disk or an additional driving wheel may engage the first disk 1a. Alternatively, a belt may be engaged with a perimeter of the first disk 1a and driven to rotate the first disk 1a. These and other alternative drive methods, realizable by those of ordinary skill in the art having the benefit of the present disclosure, are considered to be within the scope and spirit of the present invention.

The read position location is primarily determined by three variables. A distance G, a disk radius, and a clearance margin. The distance G is a width of readable medium on a surface of the disks 1a–1c in the radial direction. The first disk 1a must be sufficiently displaced from the remaining disks, 1b and 1c, to allow complete exposure of a radial segment of the readable medium to the optical pickup 10. Therefore, an inner perimeter of the readable medium must clear an outer perimeter of the remaining disks, 1b and 1c, by the clearance margin necessary to allow the optical pickup 10 to scan the entire readable medium as the first disk 1a rotates. Thus displacement is determined by the radial width G of the readable medium and a clearance margin.

When the first disk 1a is in the read position, the center aperture 50 overlaps the disks, 1b and 1c, remaining in the magazine 3 since the present invention does not require a turntable to engage center aperture 50. Therefore, because the first disk 1a can be rotated in a scanable manner without the use of a turntable, the size restriction of the prior art, necessitated by displacement equal to a disk radius, plus a turntable radius, plus clearance, is eliminated. In the present invention the displacement required is reduced to the radial width G of the readable medium and the clearance margin. The clearance margin includes the distance necessary to allow an objective lens 11 of the optical pickup 10 to scan the inner perimeter of the readable medium, and a distance equal to an outer, unreadable margin of the first disk 1a where the drive wheel 7 engages the first disk 1a. Thus, the elimination of the turntable in the present invention allows the disk reader to be reduced to a size not heretofore possible.

Figure 6:
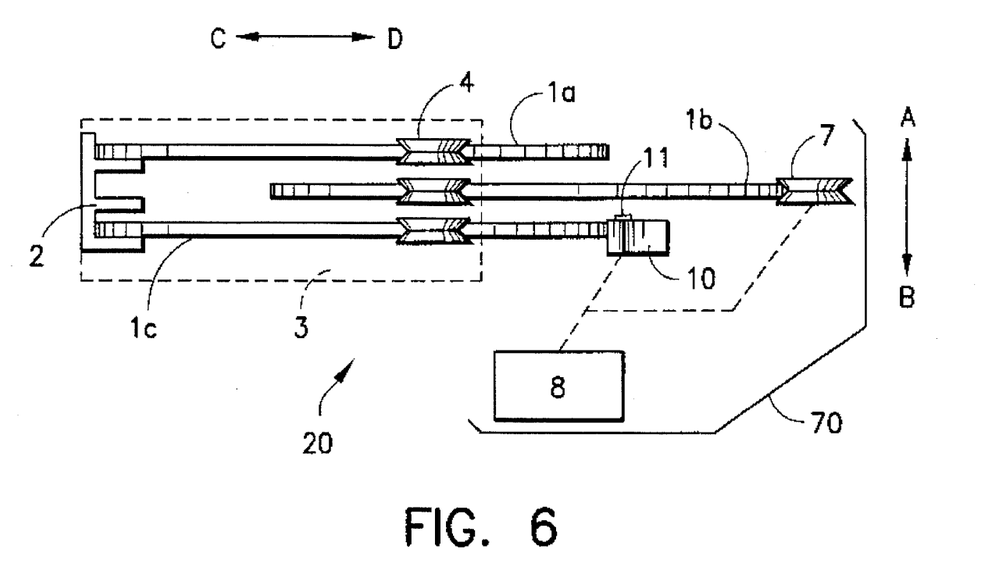
FIG. 6 is a side elevation view of the disk player of FIG. 2 showing a second disk in the read position.

Referring to FIG. 6, the optical pickup 10 and the drive wheel 7 are shown moved by the alignment mechanism 8, from the position of FIG. 5, along the axis A–B to a position for reading the second disk 1b in the magazine 3. The exchange of disks illustrated by FIGS. 5 and 6 is initiated by the disk transport mechanism 6 (shown in FIGS. 4 and 2) engaging the first disk 1a and moving it against the bias of the rollers 4 back into the magazine 3. Once the center of the first disk 1a passes the rollers 4, the bias of the rollers 4 assists the disk transport mechanism in returning the first disk 1a to the magazine 3. Once secured in the magazine 3, as shown in FIG. 2, the first disk 1a is retained in the magazine by the bias force of the rollers 4. The alignment mechanism 8 is then engaged to move the optical pickup 10 and drive wheel 7 from an alignment corresponding to the first disk 1a, as shown in FIG. 3, to an alignment corresponding to the second disk 1b, as shown in FIG. 6. The alignment, corresponding to the second disk 1b, positions the drive wheel 7 in a plane of the second disk 1b and the optical pickup 10 proximately below the plane of the second disk 1b. Similarly, the optical pickup 10 and drive wheel 7 are placed in an alignment corresponding to the third disk 1c.

Details of the alignment mechanism 8 are omitted from the present disclosure since such mechanisms are known to those ordinarily skilled in the art. As such, no further description is necessary since this mechanism may be readily implemented. For the purpose of the present invention, it is clear that the alignment mechanism 8 may either move the optical pickup 10 and drive wheel 7 relative to the magazine 3 and a chassis of the disk player 20; or the magazine 3 may be moved relative to the optical pickup 10 and drive wheel 7, and the chassis. Details of the disk transport mechanism 6 and the driver mechanism 9 are similarly omitted as being realizable by those of ordinary skill in the art.

Figure 7:
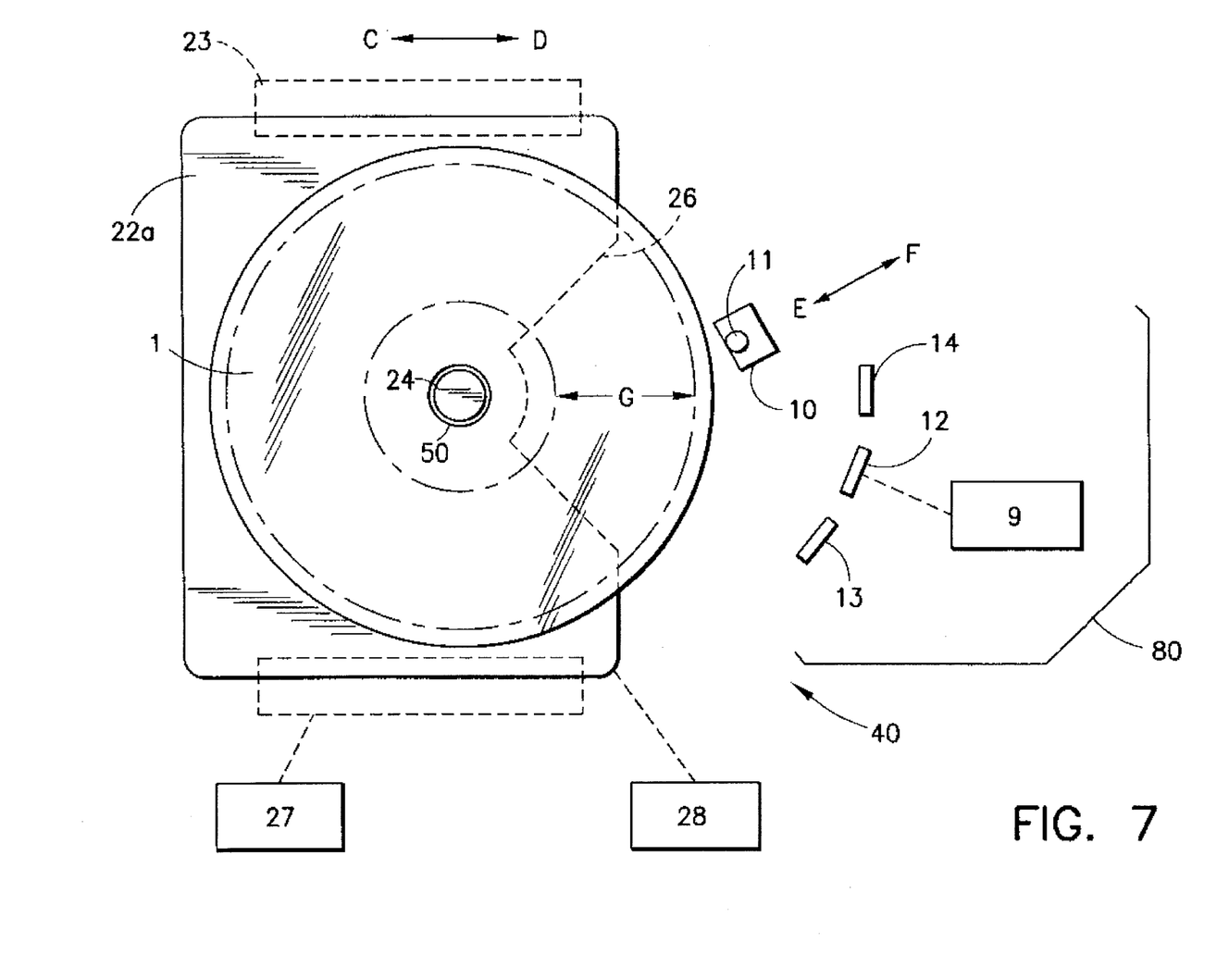
FIG. 7 is a plan view of another embodiment of a disk player of the present invention.
Figure 8:
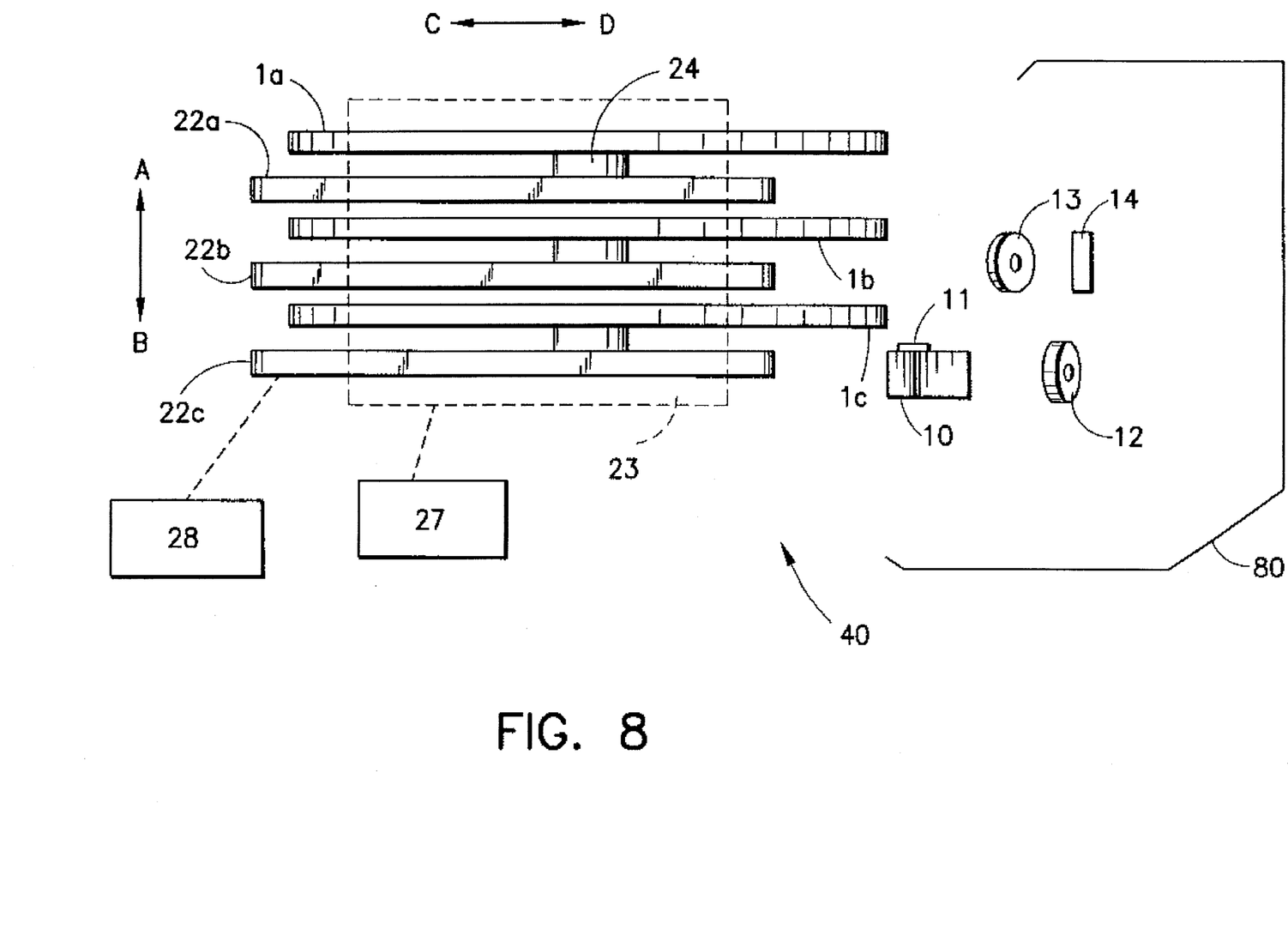
FIG. 8 is a side elevation view of the disk player of FIG. 7.
Figure 9:
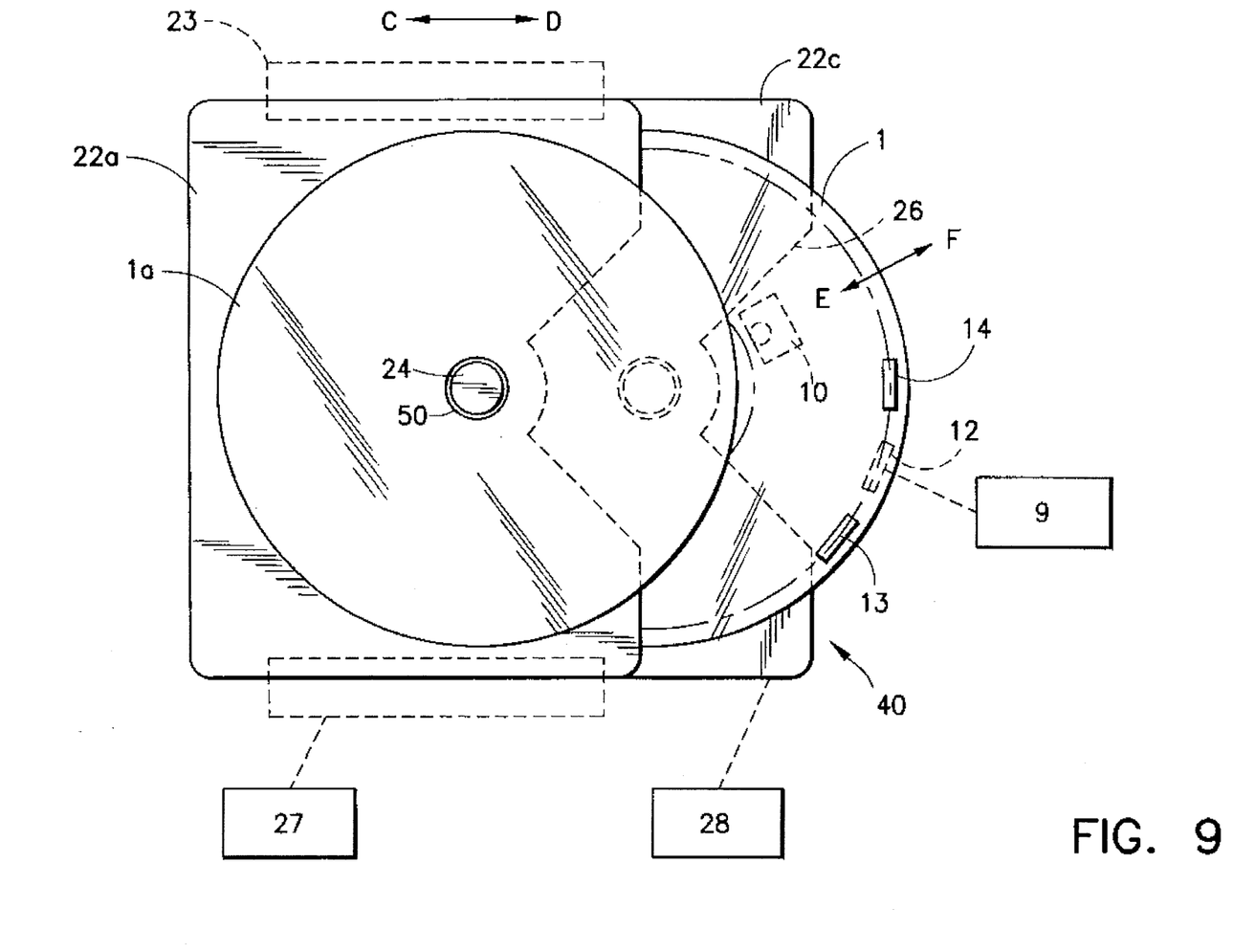
FIG. 9 is a plan view of the disk player of FIG. 7 showing a third disk in a read position.
Figure 10:
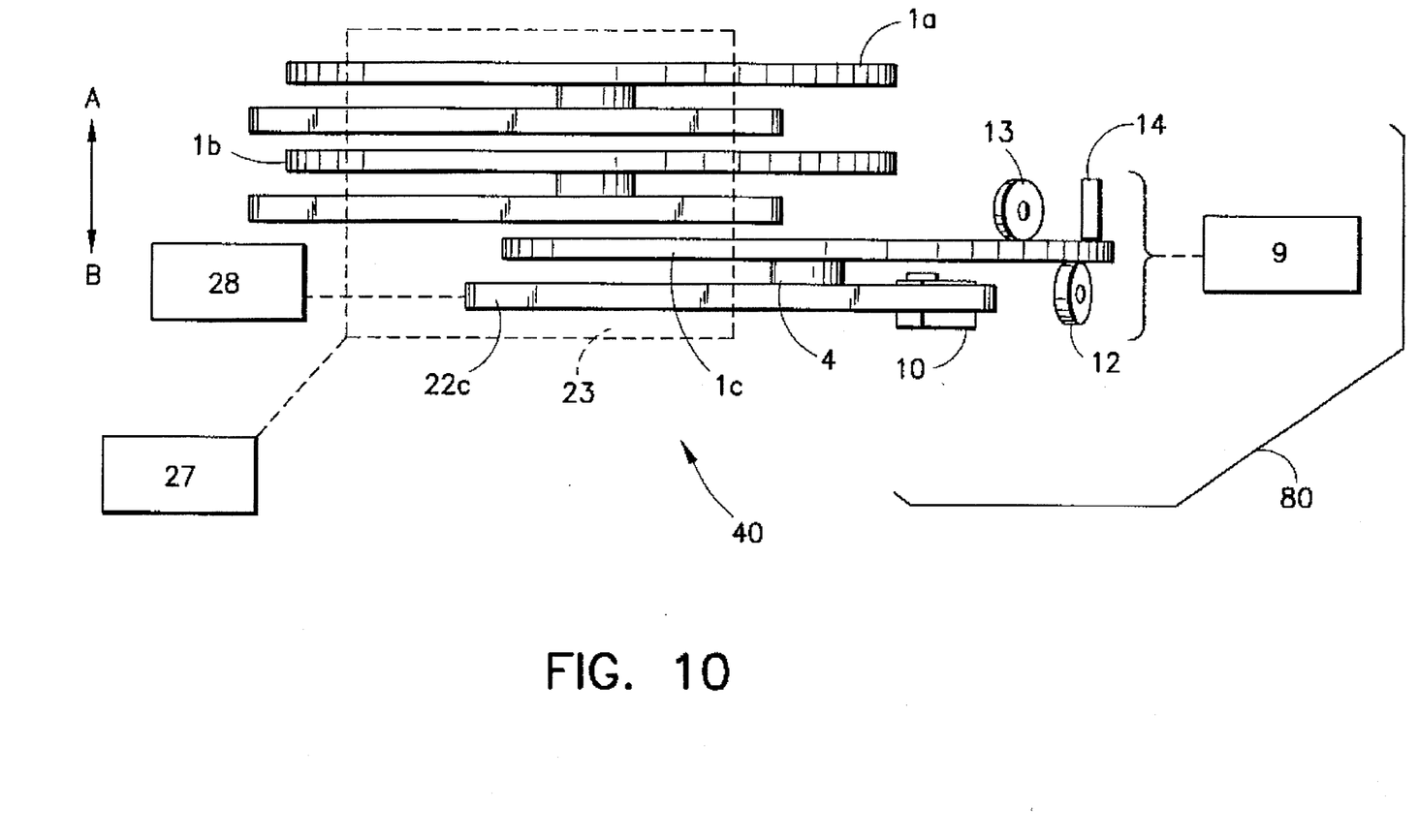
FIG. 10 is a side elevation view of the disk player of FIG. 7 showing the third disk in the read position.

Referring to FIGS. 7 and 8, a second embodiment is shown of a disk player 40 of the present invention. The disk player 40 has a magazine 23 (shown in dashed outline) which holds carriages 22a–22c, each supporting one of the disks 1a–1c. Each of the carriages 22a–22c has a rotatably mounted shaft 24 pressed into the center aperture 50 of each of the disks 1a–1c. The shafts 24 support each of the disks 1a–1c a distance sufficient to provide clearance for the disks 1a–1c to rotate freely relative to the carriages 22a–22c. A magazine alignment mechanism 27 is coupled to the magazine 23 to move the magazine 23 along the A–B axis, perpendicular to the planes of the disks 1a–1c and relative to the optical pickup 10. A carriage transport mechanism 28 is selectively coupled to one of the carriages 22a–22c by the alignment of the magazine 23 placing a selected carriage and disk in alignment with the carriage transport mechanism 28. The carriages 22a–22c are transported, parallel to the C–D axis, from the magazine 23 to a read position, as shown in FIGS. 9 and 10 in the case of the third carriage 22c. Although the carriages 22a–22c rotatably support the disks 1a–1c upon the shafts 24, alternative embodiments of carriages can include rotatably supporting disks upon rollers or idler wheels engaging perimeters of the disks.

Referring to FIGS. 9 and 10, each of the carriages 22a–22c has a notch opening 26 which provides access to the readable medium of the disks 1a–1c held thereon in the radial range of the dimension G shown in FIG. 7. The area of the disks 1a–1c occupied by readable medium is outlined by two double dashed circumferential lines bounding the dimension G. A disk reader assembly 80 includes the optical pickup 10, the driver mechanism 9, idler rollers 13 and 14, and drive roller 12. The driver mechanism 9 rotates the drive roller 12 which functions in conjunction with idler rollers 13 and 14. The idler rollers, 13 and 14, press against a top surface of the third disk 1c and oppose fierce exerted by the drive roller 12 pressing against a bottom surface of the third disk 1c. The drive roller 12 is thus driven by the driver mechanism 9 to rotate the third disk 1c. The drive roller 12 is preferably formed from a synthetic rubber material having a coefficient of friction suitable for driving disks under the force produced by the idler rollers, 13 and 14. Each of the idler rollers, 13 and 14, are disposed along a common circumference of the third disk 1c. The drive roller 12 at a radial angle offset approximately 20° from the idler rollers, 13 and 14.

The third disk 1c is positioned at the read position wherein the innermost circumference of the readable medium is aligned outside the outer perimeter of the disks, 1a and 1b, remaining in the magazine 23. The center aperture 50 of the third disk 1c is overlapped by the disks, 1a and 1b, remaining in the magazine 23. As discussed above with reference to the first embodiment, such an arrangement allows a displacement distance from a storage position to the read position which exceeds the radial width of readable medium only by an amount sufficient to allow for optical pickup head clearance and an outer unrecorded amount upon the circumferential margin of the disks 1a–1c. Thus, the disks 1a–1c are rotatably supported upon idler shafts 24 of the carriages 22a–22c and are driven by the drive roller 12 while the center aperture 50 of the selected disk overlaps disks remaining in the magazine 23.

Engagement of the third disk 1c by the idler and drive rollers, 12–14, is initiated by the transport of the third disk 1c from the magazine 23 to a position interposed between the drive roller 12 and the idler rollers, 13 and 14. Once the third disk is so positioned, the drive roller 12 and idler rollers, 13 and 14, are brought together by the driver mechanism 9 to clamp the third disk 1c therebetween. Since the idler rollers, 13 and 14, are offset from the drive roller 12, and thus not directly opposing the drive roller 12, the third disk is engaged are multiple points along its circumference which provides a stable supporting arrangement even where disturbances may affect the idler shafts 24. Thus, surface vibrations, which are detrimental to retrieving data from the disks 1a–1c, are minimized.

Figure 11:
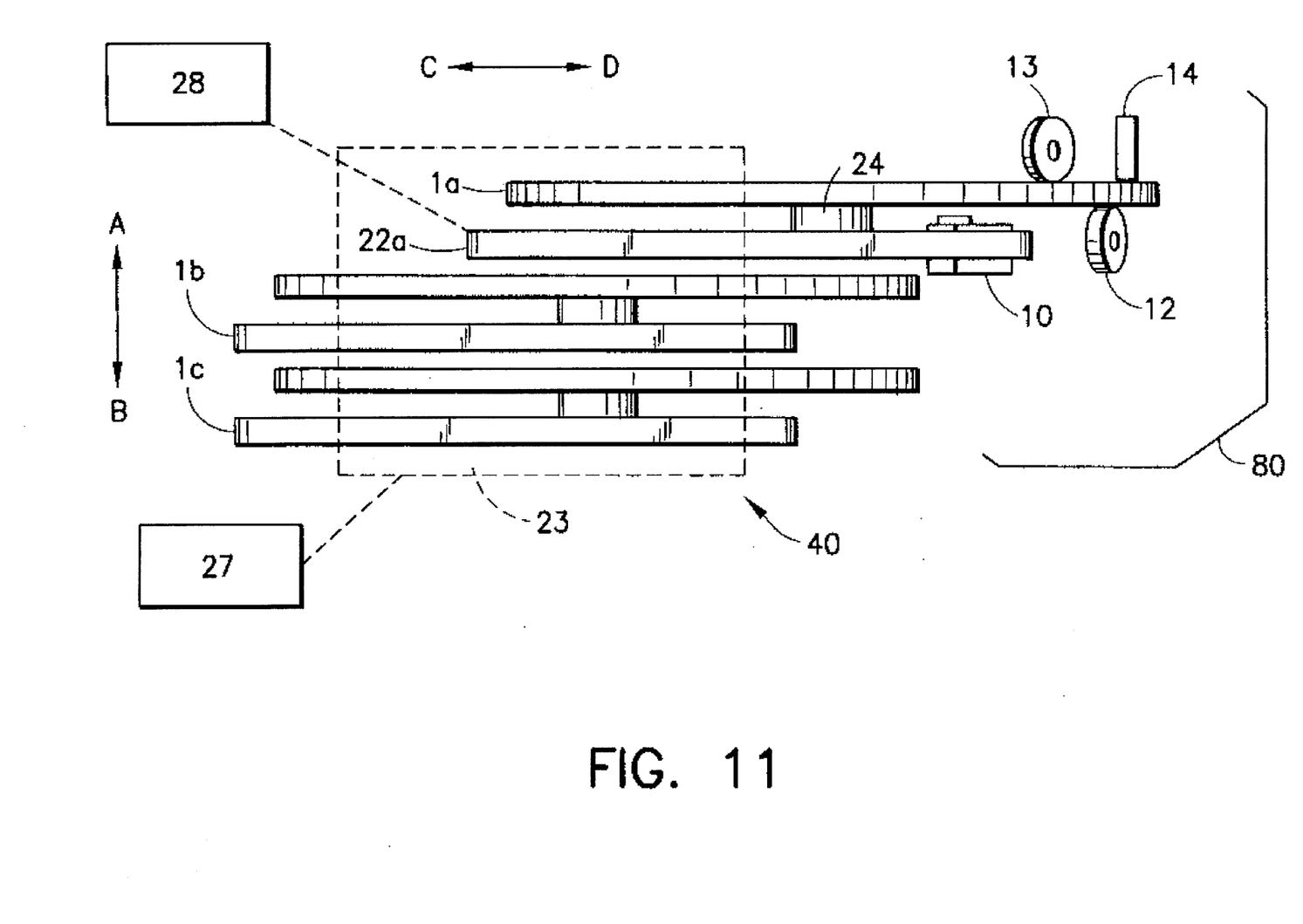
FIG. 11 is a side elevation view of the disk player of FIG. 7 showing a first disk in the read position.

Referring to FIGS. 10 and 11, two extremes of alignment of the magazine 23 are shown. In FIG. 10, the magazine 23 is set in an uppermost extreme position such that the third disk 1c, at the lowest position, is aligned engageable with the drive roller 12 and the idler rollers, 13 and 14. Starting with the playback state of shown in FIG. 10, playing of the first disk 1b is initiated by activating the driver mechanism 9 to separate the drive roller 12 from the idler rollers, 13 and 14, thereby releasing the third disk 1c. Next, the carriage transport 28 (shown in FIG. 9) mechanism is operated to transport the third carriage 22c back into the magazine 23. The magazine alignment mechanism 27 is then actuated to move the magazine in the B direction along an axis parallel to the A–B axis shown to align the first disk 1c with the carriage transport mechanism 28. Finally, the carriage transport mechanism 28 transports the first carriage 22a and disk 1a to the read position where the drive and idler rollers, 12–14, engage the first disk 1a on the outer perimeter margin thereof for playing. The disk player 40 performs a similar series of operations to store the first disk 1a and select and play the second disk 1b. However, the magazine 23 moves relative to the disk transport mechanism 28 in the A direction.

Various magazine alignment configurations are realizable by one of ordinary skill in the art in view of this disclosure. The alignment of the magazine 23 is accomplishable by moving the magazine 23 relative to a chassis of the disk player 40 while the transport mechanism 28 and disk reader assembly 80 remain in a position fixed relative to the chassis. Alternatively, the magazine 23 may be fixed and the transport mechanism 28 and the disk reader assembly 80 moved relative to the chassis. These and other variations the mechanisms discussed herein are considered to be within the scope and spirit of the present invention.

Figure 12:
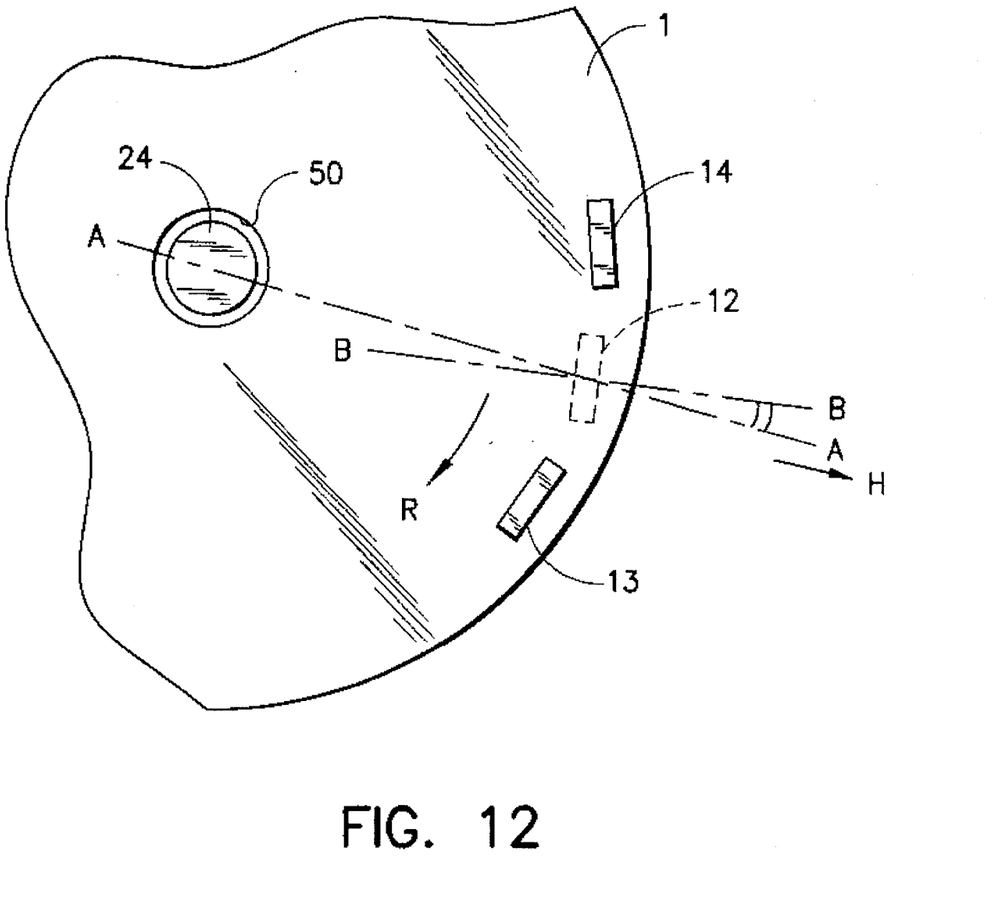
FIG. 12 is a plan view of an embodiment of a drive roller arrangement in the disk player of FIG. 7.

Referring to FIG. 12, a center axis B—B of the drive roller 12 is positioned in relation to the disk 1 to effect a bias. To ensure that the disk 1 is read properly, excess play must be minimized in the rotation of the disk 1. Since there is a finite amount of play in the shaft 24, it is desirable to bias the shaft 24 in a given radial direction to eliminate the play involved. Once biased, the shaft continuously rotates in a position minimizing the bias pressure which in turn reduces play. To effect such a bias, the center axis B—B is disposed at angle of one to two degrees with respect to a radial projection A—A of the shaft 24 in a plane of the disk 1. This arrangement produces a constant outward radial bias on the shaft 24 in the direction H when the drive roller 12 rotates the disk 1 in the direction R. Therefore, any tendency of the disk 1 to wander due to play in the shaft 24 is prevented by the bias in the H direction thereby providing tolerance to vibrations.

Figure 13:
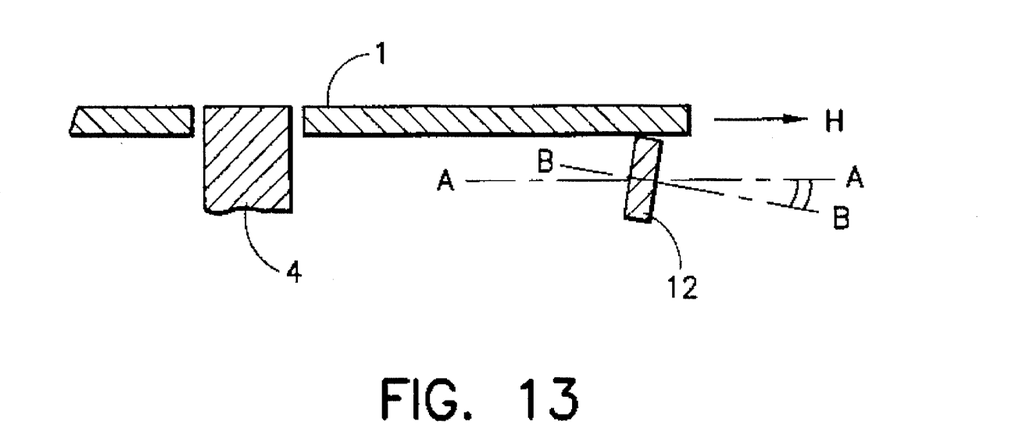
FIG. 13 is a side elevation view of another embodiment of a drive roller arrangement in the disk player of FIG. 7.

Referring to FIG. 13, the center axis B—B of drive roller 12 is set at angle of one to two degrees with respect to radial projection A—A parallel to a plane of the disk 1 (the angle is exaggerated for purposes of explanation). This orientation also produces a bias in the H direction which minimizes play in the disk rotation. It is also realized that the drive roller 12 can also be angled in planes both parallel and perpendicular to the plane of the disk 1 to apply additional bias force to the shaft 24. Furthermore, bias in an axial direction is also implementable by the exertion of force upon the disk 1 in a direction perpendicular to the plane of the disk.

Details of the various mechanisms discussed above are omitted for purposes of clarity and are realizable by those of ordinary skill in the art having viewed this disclosure. Furthermore, it is realized that the configuration of the disk reader assembly 80 discussed above may be varied. For example, the drive roller 12 and idler rollers, 13 and 14, may be replace by a pair of edge rollers effecting a bias towards a center of the shaft 24. Alternatively, a drive belt engaging the edge of a selected disk at the read position is also realizable in the present invention. These and other variations are considered to be within the scope and spirit of the present invention.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A disk player for storing and playing disks comprising:

a magazine for holding said disks;

each of said disks being concentrically aligned in said magazine;

a common axis of said disks concentrically aligned in said magazine;

a disk reader for reading a selected disk partially removed in a direction perpendicular to said common axis from said magazine to a read position whereat an axis of said selected disk is substantially remote from said common axis and said axis of said selected disk overlaps disks which remain in said magazine;

means for aligning said selected disk in said magazine with said disk reader;

means for transporting said selected disk between said disk reader and said magazine;

means for rotating said selected disk at said read position; and said means for rotating being located outside of said magazine when said disk is rotated.

2. The disk player according to claim 1 wherein said means for rotating includes means for rotatably supporting said selected disk at a perimeter area thereof.

3. The disk player according to claim 1 wherein said means for rotating said selected disk includes:

support rollers engaging an edge of said selected disk; and drive means for applying a force to an edge of said selected disk to rotate said disk.

4. The disk player according to claim 3 wherein said drive means includes an edge roller for applying a torque to said selected disk about a center of said selected disk.

5. The disk player according to claim 1 further comprising:

carriages for carrying disks between said magazine and said read position; and said carriages including means for rotatably supporting said disks above surfaces of each of said carriages.

6. The disk player according to claim 1 wherein said means for rotating said selected disk includes:

means for rotatably supporting said selected disk;

an idler roller engaging a first surface of said selected disk at a perimeter thereof; and drive means for applying a force to a second surface of said selected disk, opposing said first surface, to rotate said disk.

7. The disk player according to claim 6 wherein said drive means includes a driving roller driven by a driver mechanism.

8. The disk player according to claim 6 wherein said drive means includes means for applying a bias to said selected disk effective to urge said first and second surfaces into positive engagement with said idler roller and said drive means, respectively, whereby movement of said selected disk other than rotational movement of said selected disk about said axis of said selected disk is prevented.

9. The disk player according to claim 1 wherein said drive means includes:

an idler roller engaging a first surface of said selected disk at a perimeter thereof;

a driving roller for applying a force to a second surface of said selected disk, to rotate said disk;

said driving roller being positioned opposite, said first surface; and an axis of said driving roller forming a first non-zero angle with a radial line of said selected disk, said radial line intersecting the point where said driver roller contacts said selected disk.

10. The disk player according to claim 9 wherein said axis of said driving roller is parallel to a plane of said selected disk and is disposed at a non-zero angle relative to said radial line of said selected disk.

11. The disk player according to claim 10 wherein said angle is in the range of one to two degrees.

12. The disk player according to claim 9 wherein said axis of said driving roller is at a second non-zero angle relative to a plane of said selected disk and said axis coincides with said radial line of said selected disk.

13. The disk player according to claim 12 wherein said second non-zero angle is in the range of one to two degrees.

14. The disk player according to claim 1, wherein said means for rotating is located such that said disk must be displaced from a position in which said disk is aligned with said common axis in a direction parallel to a surface of said disk, whereby said disk is moved to a position at least partly outside said magazine.

15. A disk player for storing and playing disks comprising:

a magazine for holding said disks;

each of said disks being concentrically aligned in said magazine;

a common axis of said disks concentrically aligned in said magazine;

a disk reader for reading a selected disk partially removed in a direction perpendicular to said common axis from said magazine to a read position whereat an axis of said selected disk is substantially remote from said common axis and said axis of said selected disk overlaps disks which remain in said magazine;

means for aligning said selected disk in said magazine with said disk reader;

means for transporting said selected disk between said disk reader and said magazine;

support rollers engaging an edge of said selected disk at said read position;

an edge roller for applying torque to said selected disk, about a center of said selected disk, at said read position; and said edge roller located outside of said magazine while applying torque to said selected disk.

16. The disk player according to claim 15 wherein means for disposing and biasing said support rollers at an opening of said magazine bias a selected disk both into said magazine and into said edge roller dependent upon a positioning of said disk.

17. A disk player for storing and playing disks comprising:

a magazine for holding said disks;

each of said disks being concentrically aligned in said magazine;

a common axis of said disks concentrically aligned in said magazine;

a disk reader for reading a selected disk partially removed in a direction perpendicular to said common axis from said magazine to a read position whereat an axis of said selected disk is substantially remote from said common axis and said axis of said selected disk overlaps disks which remain in said magazine;

means for aligning said selected disk in said magazine with said disk reader;

means for transporting said selected disk between said disk reader and said magazine;

carriages for carrying disks between said magazine and said read position;

said carriages including means for rotatably supporting said disks above surfaces of each of said carriages;

an idler roller engaging a first surface of said selected disk at a said read position;

a driving roller for applying a force to a second surface of said selected disk, to rotate said disk at said read position; and said driving roller being positioned opposite said first surface;

an axis of said driving roller forming a first non-zero angle with a radial line of said selected disk, said radial line intersecting the point where said driver roller contacts said selected disk; and said idler roller and said driving roller located outside of said magazine while said driving roller applies force to said second surface of said selected disk.

18. The disk player according to claim 17 wherein said axis of said driving roller is parallel to a plane of said selected disk and said axis is disposed at an angle relative to said radial line of said selected disk.

19. The disk player according to claim 18 wherein said angle is in the range of one to two degrees.

20. The disk player according to claim 17 wherein said axis of said driving roller is at an second angle relative to a plane of said selected disk and said axis coincides with said radial line of said selected disk.

21. The disk player according to claim 20 wherein said second angle is in the range of one to two degrees.

22. A disk player comprising:

a magazine for holding said disks;

a disk reader for reading a selected disk removed from said magazine to a read position whereat a center aperture of said selected disk overlaps disks which remain in said magazine;

means for aligning said selected disk in said magazine with said disk reader;

means for transporting said selected disk between said disk reader and said magazine;

means for rotating said selected disk at said read position;

carriages for carrying disks between said magazine and said read position;

said carriages including means for rotatably supporting said disks above surfaces of each of said carriages;

each of said carriages having an idler shaft for engaging a center aperture of a disk carried thereon; and said carriage including means for rotatably mounting said idler shaft to rotatably support said disk above a surface of said carriage.

\* \* \* \* \*